United States Patent [19]

Hoffmann et al.

[11] 4,297,744

[45] Oct. 27, 1981

[54] PROCESS AND DEVICE FOR MULTIPLYING A STOCHASTIC VALUE BY A COEFFICIENT GREATER THAN THE UNIT

[75] Inventors: Jean-Claude Hoffmann; Francis Castanie, both of Toulouse; Henri Crabere, L'Union; Jean-Pierre Verdier, Cazeres; Norbert Voisin, Bruguieres, all of France

[73] Assignee: Societe Nationale Industrielle Aerospatiale, Paris, France

[21] Appl. No.: 161,009

[22] Filed: Jun. 19, 1980

Related U.S. Application Data

[63] Continuation of Ser. No. 956,963, Nov. 2, 1978, abandoned.

[30] Foreign Application Priority Data

Nov. 9, 1977 [FR] France .................................. 77 33777

[51] Int. Cl.³ .............................................. G06F 7/70
[52] U.S. Cl. ...................................... 364/703; 364/754
[58] Field of Search ...................... 364/703, 754, 554; 307/220 R, 225 R; 328/160

[56] References Cited

U.S. PATENT DOCUMENTS 3,725,677  4/1973  Lawlor .................................. 307/260
3,828,169  8/1974  Fluet .................................... 364/703
3,970,954  7/1976  Even ................................. 364/703 X

OTHER PUBLICATIONS

Ice, "Pulse Frequency Control", *IBM Tech. Disclosure Bulletin*, vol. 9, No. 11, Apr. 1967, pp. 1539–1540.
Miller et al., "A Study of an Output Interface for a Digital Stochastic Computer", *Int. J. Electronics*, vol. 37, No. 5, 1974, pp. 637–655.

*Primary Examiner*—David H. Malzahn
*Attorney, Agent, or Firm*—Merriam, Marshall & Bicknell

[57] ABSTRACT

The invention relates to a process for multiplying a stochastic value at the most equal to 0.5, by a number $1+K$, with $0<K\leq 1$, which stochastic value is physically represented by a sequence of logic 0 and 1 levels, such that in a certain interval of time, N logic 1 levels appear, according to which process, a first auxiliary sequence is formed from said sequence, comprising KN logic 1 levels, then a second auxiliary sequence comprising N logic 1 levels, each logic 1 level of each of the two auxiliary sequences being on the one hand deducted from a logic 1 level of the initial sequence and on the other hand temporally opposite a zero level of the other auxiliary sequence, after which said auxiliary sequences are added to each other. The invention is more particularly applicable to the stochastic processing of information.

11 Claims, 6 Drawing Figures

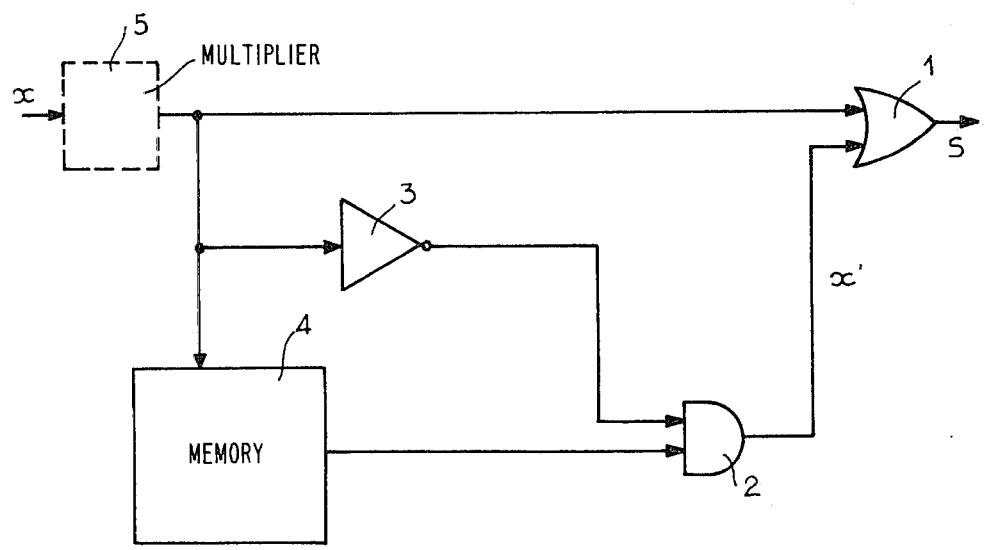
Fig: 1
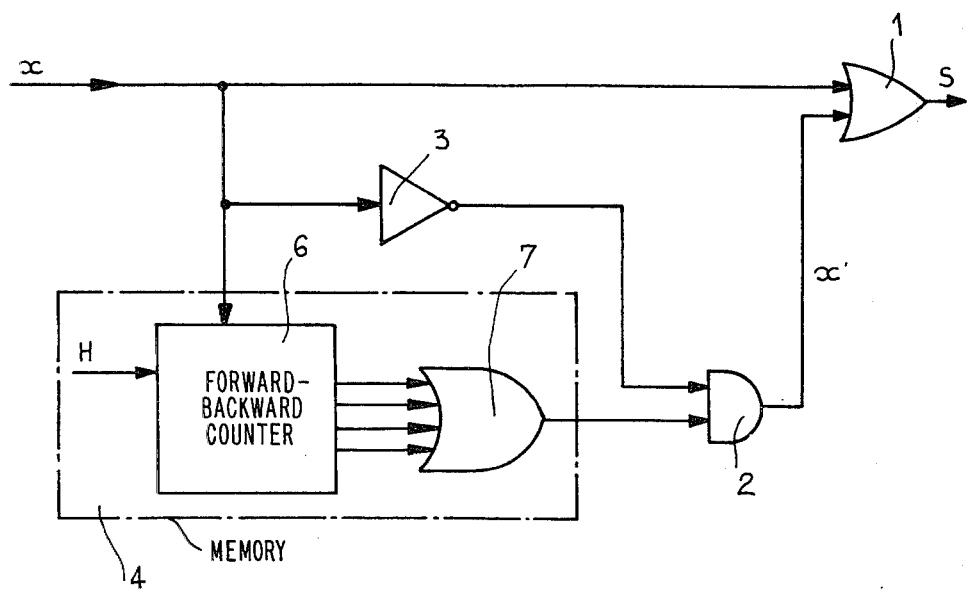
Fig: 3

PROCESS AND DEVICE FOR MULTIPLYING A STOCHASTIC VALUE BY A COEFFICIENT GREATER THAN THE UNIT

This is a continuation, of application Ser. No. 956,963, filed Nov. 2, 1978 now abandoned.

The present invention relates to a process and a device for multiplying a stochastic value at the most equal to 0.5, by an number $\alpha = 1 + K$ included between 1 and 2, and which may be equal to 2. The number K is therefore such that $0 < K \leq 1$.

It is known that the stochastic coding of analog or digital information x consists in making a discrete random variable X of which the statistical mean P is equal to x correspond to this information. A particular application of the principle is the case of X being binary, formed of 0 and 1 states; in this case, P represents the probability of having 1.

Such a stochastic coding is used in certain calculating and data converting devices, as well as for the transmission of information.

More concretely, a value coded stochastically by a probability less than or equal to 0.5 is represented physically by levels corresponding to a logic 1, of which the temporal mean is less than or equal to 0.5. This is translated by the fact that, in a certain interval of time, more or as many zeros as ones appear. If therefore it is desired to multiply this stochastic value x by 2 (case of K=1), it is therefore indispensable to double the number of the logic ones.

It will readily be understood that in the general case, the number of the logic ones should therefore be multiplied by the factor $1+K$.

It is an object of the present invention to provide a simple process and device for obtaining such a multiplication of the logic ones of a stochastic magnitude.

To this end, according to the invention, the process for multiplying a stochastic value x at the most equal to 0.5, by a number $1+K$, with $0<K\leq 1$, which stochastic value is physically represented by a sequence of logic 0 and 1 levels, such that in a certain interval of time, N logic 1 levels appear, is noteworthy in that, from said sequence, a first auxiliary sequence is formed, comprising KN logic 1 levels, then a second auxiliary sequence comprising N logic 1 levels, each logic 1 level of each of the two auxiliary sequences being on the one hand deducted from a logic 1 level of the initial sequence and on the other hand, temporally opposite a zero level of the other auxiliary sequence, after which said auxiliary sequences are added to each other.

A final sequence is therefore obtained in this way, comprising $N+KN=N(1+K)$ logic 1 levels, i.e. a final sequence $(1+K)$ times greater than the initial sequence. The initial stochastic value has therefore been multiplied by the factor $1+K$.

In an advantageous embodiment of the process of the invention, to obtain the first auxiliary sequence, said stochastic value x is multiplied, in known manner, by the number K, coded stochastically by a source of random noise independent of the source of random noise having served to code the value x, whilst, to obtain the second auxiliary sequence, the initial sequence is stored and it is restored with delay.

The carrying out of the process according to the invention is particularly advantageous in the case of K=1. In fact, in this particular case, the first auxiliary sequence may be directly formed by the initial sequence and it then suffices to form the second auxiliary sequence and to add it to the first. A process of multiplication by 2 is then obtained very simply. It will be noted that, due to such a simple process of multiplication by 2, it is possible to obtain the multiplication of the stochastic value x by any value $\alpha$ with $1<\alpha\leq 2$. In fact, the stochastic value is firstly multiplied by $\alpha/2$, by a known process, so as to obtain the value $(\alpha/2)\cdot x$, after which the process of multiplication by 2 according to the invention is applied to this value $\alpha/2 \cdot x$ to obtain the value $\alpha\cdot x$.

For carrying out this process, it is advantageous if a device according to the invention comprises two channels in parallel respectively terminating at two inputs of a logic gate of OR type, said first and second channels respectively conveying said first and second sequences. Said first channel, which receives the value x, either comprises a multiplier by K of known type when $0<K<1$, or is formed by a single link line if K=1. On the other hand, the second channel comprises on the one hand a memory recording all the 1 levels of the value x and restoring them at its output and, on the other hand, an inverter receiving either the value x or the value K x and controlling the restoration of the 1 levels recorded by said memory during the 0 levels of the value x via an AND gate of which the output is connected to the corresponding input of the OR gate.

Said memory is preferably formed by a digital forwardbackward counter of which the forward counting is controlled by the 1 levels of the value x and backward counting by the 0 levels thereof. To this end, the backward counting control of said forward-backward counter may be connected to the output of said inverter. In this case and in the case of the first channel comprising a multiplier by K, it is advantageous if the input of said inverter is connected to said first channel, downstream of said multiplier.

The outputs of the forward-backward counter are advantageously connected in parallel to as many inputs of another OR gate of which the output is connected to the corresponding input of the AND gate.

Thus, in an advantageous embodiment of the device for multiplying the stochastic value x by 2, this device comprises, between the input of the value x and the output of the value 2 x, an OR gate of which the output forms said output for the value 2 x and of which one input is directly connected to the input of the value x, the other input of the OR gate being connected to the output of an AND gate of which one of the inputs is connected to the input of the value x by an inverter, the other input of the AND gate being connected to the output of another OR gate of which the inputs are connected to the outputs of the forward-backward counter, the control input of said forward-backward counter being connected to the input of the value x.

Similarly, in an advantageous embodiment of a device for multiplying the stochastic value x by $1+K$, this device comprises, between the input of value x and the output of the value x $(1+K)$, an OR gate of which the output forms said output for the value x $(1+K)$ and of which one input is connected to the output of a multiplier by K of which the input is connected to the input of the value x, the other input of the OR gate being connected to the output of an AND gate of which one of the inputs is connected to the output of said multiplier by K via an inverter, the other input of the AND gate being connected to the output of another OR gate of which the inputs are connected to the outputs of the forward-backward counter, the forward-counting and backward-counting inputs of said forward-backward counter being connected respectively to the input of the value x and to the output of said inverter.

The invention will be more readily understood on reading the following description with reference to the accompanying drawings, in which:

FIG. 1 shows the schematic digram of a multiplication device according to the invention, in the particular case of K=1.

FIG. 3 indicated the diagram of an embodiment of the device of FIG. 1.

Figure 4:
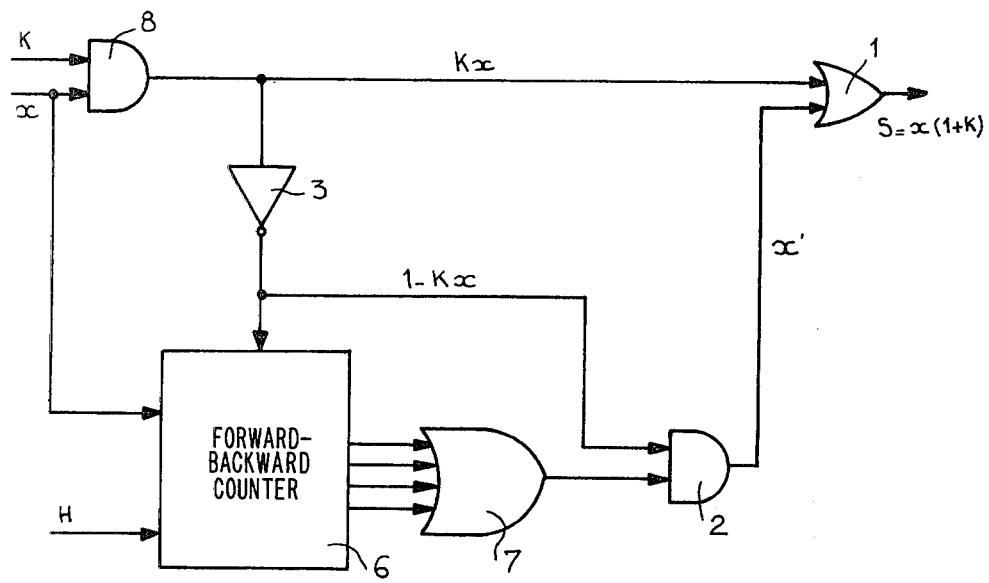

FIG. 4 shows the diagram of a multiplication device according to the invention, in the case of K taking any value between 0 and 1.

Figure 5:
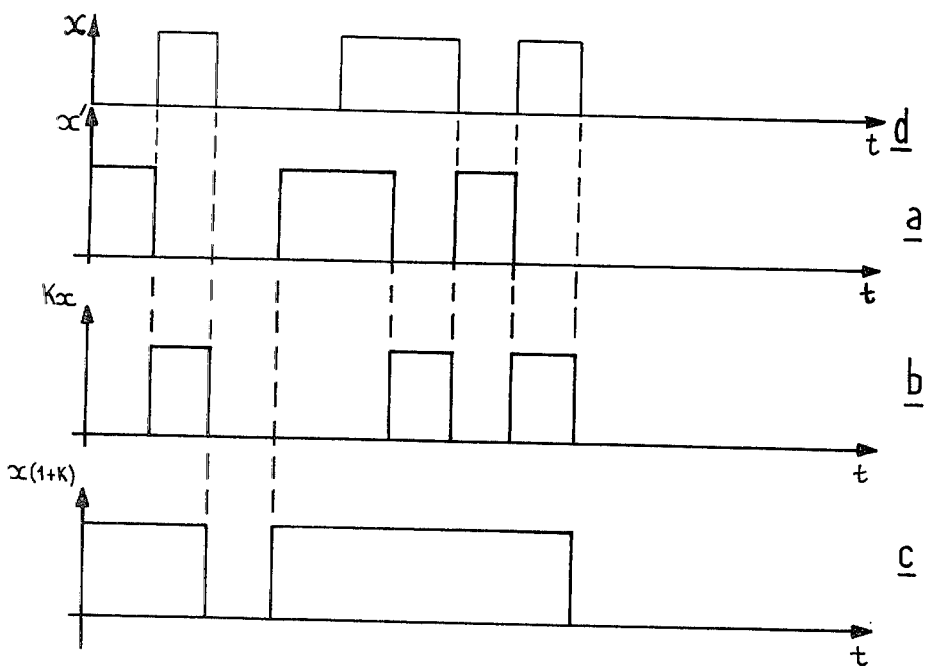

FIG. 5 is a diagram illustrating, as a function of time t, the functioning of the device of FIG. 4.

Figure 6:
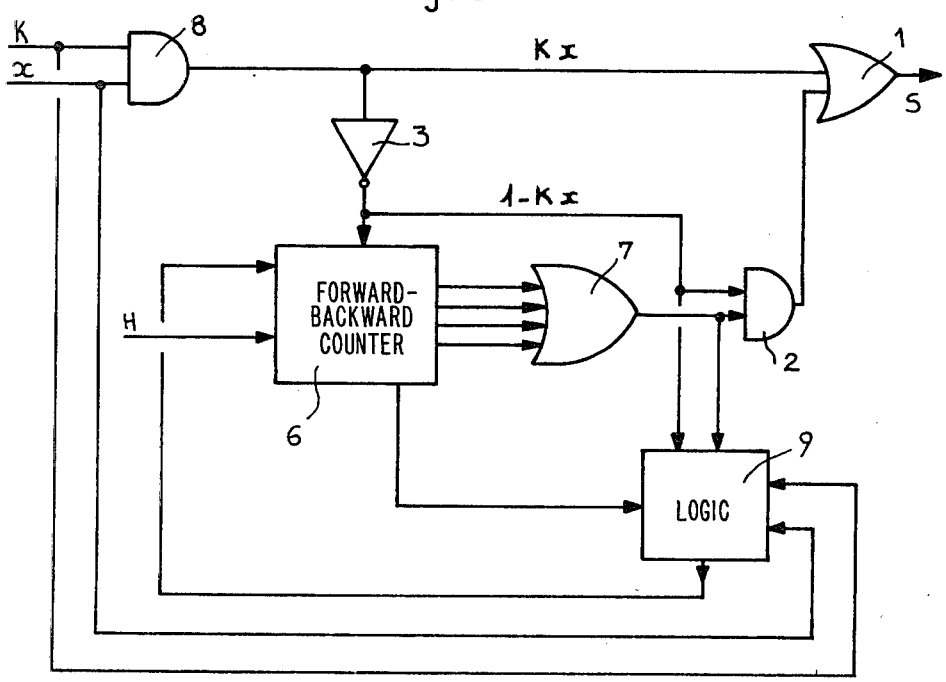

FIG. 6 shows a variant embodiment of the device of FIG. 4.

In these figures, like references denote like elements.

Figure 2:
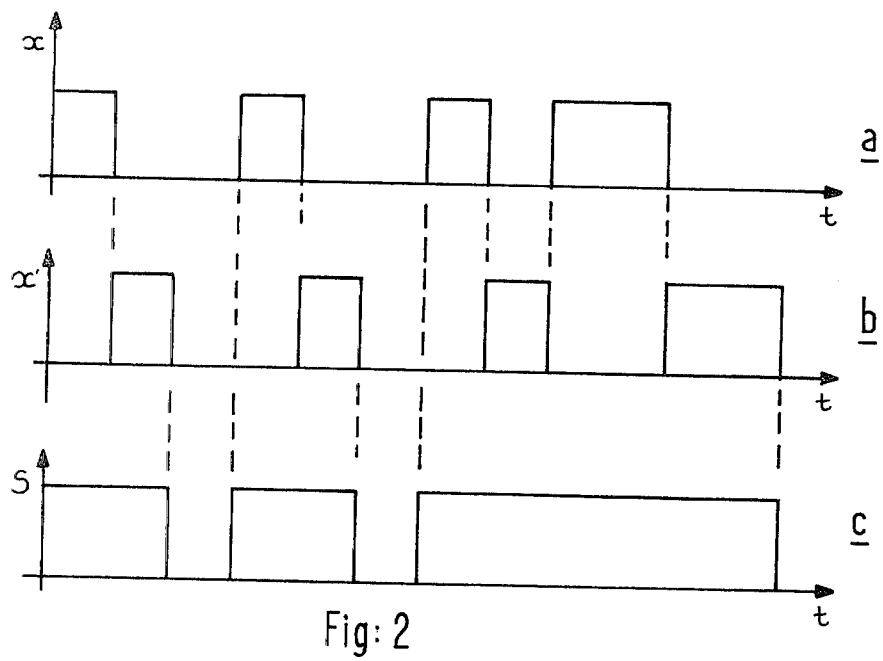
FIG. 2 is a diagram illustrating, as a function of time t, the functioning of the device of FIG. 1.

Referring now to the drawings, the device according to the invention and shown in FIG. 1, is intended for multiplying by 2 a value x, coded stochastically by a probability less than or equal to 0.5. As shown by the diagram a of FIG. 2, this coded value x is represented physically by logic 1 levels and logic 0 levels, the temporal mean of said logic levels being less than or equal to 0.5, i.e., in an interval of time corresponding to a plurality of levels, the value x comprises more or as many logic 0 levels as 1 levels.

The device of FIG. 1 comprises a logic gate 1, or OR type, of which one input directly receives the value x and, the other input, a value x', deducted from x, and coming from the output of a logic gate 2 of AND type. One of the inputs of the gate 2 receives the value x via an inverter 3, whilst the other input of the gate 2 is connected to the output of the controllable memory 4, of which the input receives the value x.

Thus, when a logic 1 level appears in the value x, on the one hand, it is automatically transmitted to the gate 1 and is found in the output signal S of the device, on the other hand, it is recorded in the memory 4 and converted to 0 level by the inverter 3, this 0 level being transmitted to the corresponding input of the gate 2. A logic 0 level therefore appears at the output of the gate 2. Consequently, a logic 0 level of the value x' corresponds to a logic 1 level of value x (cf. diagrams a and b of FIG. 2).

On the other hand, when a logic 0 level appears in the value x, the memory 4 restores at its output a logic 1 level previously recorded. As, furthermore, this logic 0 level is converted into logic 1 level by the inverter 3, the two inputs of the gate 2 receive logic 1 levels, this producing a logic 1 level in the value x'.

Thus, due to the device of FIG. 1, there corresponds to each logic 1 level of the value x a logic 1 level of the value x', delayed with respect to the first and appearing during a logic 0 level of the value x.

The gate 1 effecting the sum of the 1 levels of the two values x and x', this results in its output signal S (cf. diagram c of FIG. 2) representing double the value x. The device of FIG. 1 is therefore a multiplier by 2 of the value x.

It will be noted that if it is desired to obtain at the output of the gate 1, a value equal to $\alpha \cdot x$, $\alpha$ being a constant included between 1 and 2, it suffices, before the application of the value x to the gate 1, to the inverter 3 and to the memory 4, to intercalate a multiplier 5 of known type, capable of multiplying the value x by $\alpha/2$. Thus, it is the value $\alpha/2 \cdot x$ which will be multiplied by 2 in the device according to the invention, i.e. the value $\alpha \cdot x$ will be collected at the output of said latter. The multiplier 5 may in known manner be constituted by a logic AND gate receiving respectively at its two inputs the values coded x and $\alpha/2$, the coding of these values having to be effected by independent sources of random noise. FIGS. 4 and 6, described hereinafter, show variant embodiments of the device according to the invention for directly obtaining the multiplication of a coded value x by a constant $\alpha = 1 + K$, with $1 - \alpha \leq 2$.

FIG. 3 illustrates a variant embodiment of the device of FIG. 1, in which the memory 4 is formed by a digital forward-backward counter 6, controlled by a timing signal H, the outputs of said forward-backward counter, which each correspond to a bit, being connected to as many inputs of a logic gate 7, of OR type, of which the output is connected to the corresponding input of the gate 2. Thus, a logic 1 level of the value x may correspond to the increase by a unit of the contents of the forward-backward counter 6, whilst a logic level 0 of said value may correspond to the subtraction by one unit from said content.

The device according to the invention, shown in FIG. 4, is intended to supply at its output the value $x \cdot (1 + K)$, when the value x is applied to its input.

In this device, gates 1, 2, 7, the forward-backward counter 6 and the inverter 3 are found again, arranged in the manner described with reference to FIG. 3. Moreover, between the input of the magnitude x on the one hand and the gate 1 and inverter 3 on the other hand, is provided a multiplier by K, constituted in known manner by a gate 8 of AND type receiving the constant K and the value x, coded stochastically by independent random noises. Furthermore, the value x controls the forward counting function of the forward-backward counter 6, whilst the backward counting function of this latter is controlled by the output of the inverter 3.

Diagrams d and b of FIG. 5 give an example of values x and K x. These diagrams show that, in the case of $0 < K \leq 1$, the value K x comprises less 1 levels than the value x and that these 1 levels are opposite the 1 levels of the value x. This results in that the value $1 - K$ x given by the inverter 3 comprises all the 1 levels of the value x, plus others.

The 1 levels of the value x are all counted by the forward-backward counter 6, whilst the gate 1 receive only value K x directly on its input connected to the output of the gate 8. The inverter 3, which supplies at its output the value $1 - K$ x, blocks the gate 2 during all the 1 levels of the value K x. On the other hand for all the 0 levels of the value K x, this inverter 3, on the one hand decrements the contents of the forward-backward counter 6, and on the other hand unblocks the gate 2.

With the above remark in mind, it will be understood that the inverter 3 sends to the gate 2 a 1 level each time that a 1 level of value x, coming from the forward-backward counter 6, is presented at said gate 2. Consequently, at the output of the gate 2 there appears a value x' equal to x.

The gate 1 therefore gives an output signal $S = K \cdot x + x = x(1 + K)$ (cf. diagram c of FIG. 5).

It will be noted that in the device, when the forward-backward counter 6 is incremented N times, it is possible not to be decremented N times momentarily. However, since one can count forward more than one can count backward in a short lapse of time, it is necessary that the capacity of the forward-backward counter 6 be sufficient to avoid the saturations, failing which the multiplier according to the invention would present errors in linearity. Experience has shown that this capacity had to be at least four bits and preferably eight bits.

The device of FIG. 6 is similar to that of FIG. 4. However, it comprises, moreover, a logic 9 receiving the value x, K, 1−K·x, the output of the gate 7 and the contents of the forward-backward counter 6 and controlling the forward counting of said latter. Such a logic 9 is intended to block the forward counting when the forward-backward counter 6 is saturated and to block the backward counting when said forward-backward counter is empty.

We claim:

1. A process for multiplying a stochastic value x not greater than 0.5 by a number (1+K) wherein K is positive and not greater than 1, said stochastic value x being coded by a first source of random noise and being physically represented by an initial sequence of logic 0 and logic 1 levels such that in a certain interval of time, N logic 1 levels appear, comprising the following steps:
   forming, from said initial sequence representing x, a first auxiliary sequence comprising KN logic 1 levels;
   forming, from said initial sequence representing x, a second auxiliary sequence comprising N logic 1 levels, wherein each of said N logic 1 levels of said second auxiliary sequence occurs during a logic 0 level of said first auxiliary sequence; and
   adding said first and second auxiliary sequences.

2. A process in accordance with claim 1 including the steps of multiplying said initial sequence by K to obtain said first auxiliary sequence, K being stochastically coded by a second source of random noise independent of said first source, and
   storing said first initial sequence and restoring the same with delay to obtain said second auxiliary sequence.

3. A device for multiplying a stochastic value x not greater than 0.5 by a number (1+K) wherein K is positive and not greater than 1, said stochastic value being coded by a random noise and being physically represented by an initial sequence of logic 0 and 1 levels such that in a certain interval of time, N logic 1 levels appear, comprising:
   first means for forming, from said initial sequence representing x, a first auxiliary sequence comprising KN logic 1 levels;
   second means for forming, from said initial sequence representing x, a second auxiliary sequence comprising N logic 1 levels, wherein each of said N logic 1 levels of said second auxiliary sequence occurs during a logic 0 level of said first auxiliary sequence; and
   means for adding said first and second auxiliary sequences.

4. A device in accordance with claim 3, adapted for multiplication by 2 of said stochastic value x, wherein said adding means comprises a first OR gate having a first input receiving said value x and an output corresponding to the value 2x, said first OR gate having a second input; and said second means comprises:
   an inverter having an input receiving said value x and an output;
   a forward-backward counter having a control input receiving said value x and a plurality of outputs;
   a second OR gate having a plurality of inputs receiving respectively the outputs of said forward-backward counter, and an output; and
   an AND gate having a first input receiving the output of said inverter and a second input receiving the output of said second OR gate, the output of said AND gate feeding the second input of said first OR gate.

5. A device in accordance with claim 3, wherein said first means comprises:
   a multiplier by K having an input receiving said value x and producing an output Kx;
   said adding means comprises a first OR gate having a first input reciving the output of said multiplier, a second input, and an output corresponding to x(1+K); and
   said second means comprises:
   an inverter having an input receiving said value Kx, and an output;
   an AND gate having a first input receiving the output of said inverter, a second input, and an output connected to said second input of said first OR gate;
   a forward-backward counter having a forward-counting input receiving said value x, a backward-counting input receiving the output of said inverter, and a plurality of outputs; and
   a second OR gate having a plurality of inputs receiving respectively the outputs of said backward-forward counter, and an output connected to the second input of said AND gate.

6. A device in accordance with claim 3 wherein said adding means includes a first OR gate having separate inputs responsive respectively to said first and second auxiliary sequences.

7. A device in accordance with claim 6, wherein said first means includes a multiplier for multiplying x by K to produce a value Kx, said multiplier having an input responsive to said initial sequence and an output which is supplied to a first input of said first OR gate.

8. A device in accordance with claim 7, wherein said second means comprises:
   a memory receiving and recording all of the 1 levels of said initial sequence and restoring said values at its output,
   an inverter receiving the value Kx and controlling the restoration of the 1 levels recorded by said memory during 0 levels of the value x, and
   an AND gate having inputs responsive respectively to the outputs of said memory and said inverter and an output connected to a second input of said first OR gate.

9. A device in accordance with claim 8, wherein said memory comprises a digital forward-backward counter in which forward counting is controlled by the 1 levels of the value x and backward counting the by 0 levels thereof.

10. A device in accordance with claim 9, wherein the input of said inverter is connected to the output of said multiplier, the output of said inverter being connected to a backward counting control of said forward-backward counter.

11. A device in accordance with claim 10 further including a second OR gate having inputs connected respectively to the outputs of said forward-backward counter, the output of said second OR gate being connected to an input of said AND gate.

* * * * *